(12) United States Patent
Takahashi et al.

(10) Patent No.: US 7,181,143 B2
(45) Date of Patent: Feb. 20, 2007

(54) FREE SPACE OPTICS COMMUNICATION APPARATUS AND FREE SPACE OPTICS COMMUNICATION SYSTEM

(75) Inventors: Yasuhiro Takahashi, Saitama (JP); Masatoshi Ohtsubo, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 665 days.

(21) Appl. No.: 10/454,551

(22) Filed: Jun. 3, 2003

(65) Prior Publication Data
US 2003/0228152 A1    Dec. 11, 2003

(30) Foreign Application Priority Data
Jun. 5, 2002    (JP)    ............................. 2002-164646
Jun. 7, 2002    (JP)    ............................. 2002-167008

(51) Int. Cl.
*H04B 10/00* (2006.01)
(52) U.S. Cl. ...................................... 398/131; 398/129
(58) Field of Classification Search ................ 398/118, 398/131, 129
See application file for complete search history.

(56) References Cited

U.S. PATENT DOCUMENTS

| | | | | |
|---|---|---|---|---|
| 5,523,193 A | * | 6/1996 | Nelson | 430/311 |
| 5,593,549 A | * | 1/1997 | Stirbl et al. | 203/10 |
| 6,501,877 B1 | * | 12/2002 | Weverka et al. | 385/31 |

* cited by examiner

*Primary Examiner*—Shi K. Li
(74) *Attorney, Agent, or Firm*—Morgan & Finnegan, L.L.P.

(57) ABSTRACT

A free space optics communication apparatus which achieves high use efficiency of light and enables free control of the divergent angle of a light beam and the like is disclosed. The free space optics communication apparatus of the present invention has a light source which emits a light beam for performing wireless communication of information, and a minute mirror array unit which consists of a plurality of minute mirrors arranged in a matrix-like form and reflects the light beam emitted from the light source toward another apparatus. The apparatus also has a control unit which controls the directions of the individual minute mirrors constituting the minute mirror array unit independently. The control unit may be used to variably control the number of a plurality of mirror groups formed of a plurality of the minute mirrors in the minute mirror array unit.

4 Claims, 17 Drawing Sheets

FIG.11

FREE SPACE OPTICS COMMUNICATION APPARATUS AND FREE SPACE OPTICS COMMUNICATION SYSTEM

BACKGROUND OF THE INVENTION

1. Field of the Invention

The present invention relates to a free space optics communication apparatus which uses a light beam emerging into the space to perform wireless transmission of information.

2. Detailed Description of the Related Art

In a conventional free space optics communication system, a free space optics communication apparatus on the transmission side modulates a transmission signal into a light signal which then emerges as a light beam toward a free space optics communication apparatus on the reception side provided opposite thereto. The emerging light beam travels through the atmospheric space and is received at the free space optics communication apparatus on the reception side (another apparatus). The other apparatus demodulates the light signal transmitted through the light beam from the transmission side. In this manner, information signals are transmitted and received.

In the free space optics communication system as described above, the path of the light beam may vary due to fluctuations of the atmosphere or the like. In addition, the emerging direction of the light beam may vary since slight deformation readily occurs in a facility where the free space optics communication apparatus is installed, for example the rooftop of a building, due to a change in temperature.

When these external factors cause the light beam to arrive at varying positions on the reception side, the level of reception is reduced at the free space communication apparatus on the reception side, and at worst, communication is interrupted.

In addition, in a case that deformation occurs in a facility where the other apparatus on the reception side is installed, and the apparatus on the reception side is not disposed in a direction appropriate for the incident light beam, the level of reception is reduced and the reception may be impossible.

To solve the problems, a proposed free space optics communication apparatus is configured to emerge a light beam such that the reception side receives the light beam of large diameter to ensure a stable level of reception on the reception side even when the beam path or the emerging direction of the beam varies.

Also, the apparatus on the reception side is designed to have a certain size of light-receiving angle (an angular range in which light can be received).

FIG. 12 shows an exemplary conventional free space optics communication system. In FIG. 12, a free space optics communication apparatus 50 on the transmission side is shown on the left, while a free space optics communication apparatus 71 on the reception side (another apparatus) is shown on the right. On the transmission side, a light beam emitted from a light source 72 is converted by an optical system 73 into a light beam 76 which consists of substantially parallel rays with slight divergence. On the other hand, on the reception side, an optical system 75 is designed to have a light-receiving angle slightly divergent as compared with parallel rays. The optical system 75 converges the light beam which is received by a light-receiving element 74.

In general, to change the emerging angle or the receiving angle of a light beam in such a free space optics communication system, the optical system, the light source, or the light-receiving element is mechanically moved to change their relative positional relationship. In this case, the relative positional relationship between the light-emitting element 72 and the lens 73 is changed to vary the divergent angle. Similarly, on the reception side, the relative positional relationship between the light-receiving element 74 and the lens 75 is changed to vary the light-receiving angle.

In free space optics communication, bi-directional simultaneous communication is typically performed. A free space optics communication apparatus has a transmitting unit and a receiving unit formed therein. When the apparatus has a transmitting optical axis and a receiving optical axis coincident with each other, the apparatus can be provided with an automatic tracking function of detecting the incident direction of light transmitted from another apparatus and matching the optical axis direction of the light beam from the other apparatus with the transmitting and receiving optical axes of the apparatus itself. In this case, it is necessary to provide a means for changing the direction of a transmitting or receiving beam.

Possible methods of changing the direction of a transmitting or receiving beam include changing the angle of the entire apparatus or the optical system, providing an angular change for the beam by using a mirror in the optical system, providing a positional change between the lens and the light-emitting element or the light-receiving element, or the like.

FIG. 13 shows an example of the methods. A light beam emerging from a light-emitting element 81a at a divergent angle 83 passes through a lens 82 and then emerges therefrom as a light beam 85 consisting of substantially parallel rays.

A change in the beam emerging direction can be realized by changing the relative position between the light-emitting element (light source) 81a and the lens 82. When the light-emitting element 81a is shifted to a position 81b in FIG. 13, a light beam 84 incident on the lens 82 emerges into the space from the lens 82 as an emerging beam 86. The direction of the beam 86 is different from the direction of the aforementioned beam 85.

These methods are used not only to realize the automatic tracking function but also to align beam directions when the apparatus is installed.

Description is made for another structure which changes the relative positional relationship between the light-emitting element or the light-receiving element and the optical system with reference to FIG. 14.

At the top in FIG. 14, a light beam is emitted from the end surface of a light-emitting element 61 at a divergent angle 65. The divergent angle of the light beam is reduced by a lens 62 and then the light beam is sent into the space at a divergent angle 68 which is substantially collimated. For reducing the beam divergent angle to increase the power density of light received at a receiving unit, the light-emitting element 61 is moved on an optical axis in a direction away from the lens 62 as shown at the bottom in FIG. 14. Of output light from the light-emitting element 61, a light signal component incident effectively on the lens 62 in an angular range 66 results in a beam emerging angle 69 smaller than the angle 68. The light beam emerging from the lens 62 can become more collimated luminous flux.

However, since the divergent angle 65 of the light output from the light-emitting element 61 is constant, rays 67 which are not effectively incident on the lens 62 are ineffective to cause a reduction in light power transmitted into the space through the lens 62.

If the relative positional relationship between the light-emitting element 61 and the lens 62 is not changed and the curvature of the lens 62 can be changed, the divergent angle can be controlled effectively. However, it is difficult to form a lens or a lens unit of which the curvature can be changed, and the structure thereof is complicated. In addition, a precise mechanism and accurate control are required to avoid variations in the emerging direction of light.

Typically, in the free space optics communication, the diameter of a received beam needs to be minimized at a reception point in order to obtain sufficient light-receiving power. However, it is difficult to form a free space optics communication apparatus which can freely change the beam emerging angle or the light-receiving angle for the reasons as described above.

The shape of a beam may need to be controlled as well as the beam divergent angle. In the free space optics communication apparatus, typically, the light-receiving angle is desirably set to be large on the reception side as described earlier. If a strong light source such as the sun, a search light or the like is present behind the apparatus on the transmission side, the strong light is incident on the light-receiving element to prevent the intended light beam from being received clearly.

FIG. 15 shows how the apparatus on the transmission side is viewed from the apparatus on the reception side. A strong light source 43 such as the sun, a search light or the like, different from an inherent light source, partially enters a reception range 42 including an apparatus 41 on the transmission side viewed from the apparatus on the reception side.

Especially, the sunlight has much larger light power (energy) than the light power of a light beam from the apparatus 41 on the transmission side. Thus, a communication failure may occur if even a small amount of the sunlight enters the light-receiving range.

The conventional free space optics communication apparatus using a lens takes measures against the incidence of the strong background light as mentioned above, for example by setting a smaller light-receiving angle or changing the relative positional relationship between the light-receiving element and the lens 62 according to the circumstances as shown in FIG. 14. Such measures, however, cause a problem that stable communication is unlikely to be ensured in the presence of the fluctuations of the installation environment or the like.

On the other hand, for controlling the shape of a beam pattern or the like, it is necessary to provide an optical system responsible for that control in addition to the optical system which controls the beam emerging angle or the light-receiving angle.

In addition, the shape (and the power density distribution) of a beam pattern subjected to control is uniquely determined by the provided optical system and thus cannot be arbitrarily changed.

Furthermore, when a change in the beam emerging direction or the light-receiving direction is intended, the structure shown in FIG. 13 presents a problem that the light power output from the light-emitting element 81a is not effectively used, similarly to the method of controlling the beam emerging angle or the light-receiving angle.

Specifically, a component 87 shown in FIG. 13 is not effectively incident on the lens 82 and is unnecessary since it is not transmitted into the space. Also, if the component 81 is used as a light-receiving element, the effective light-receiving angle 86 is smaller than the angle 85 which corresponds to the original light-receiving angle, thereby reducing the efficiency of reception.

Each of the optical systems formed for the respective purposes is a solid-state lens, a prism or the like. It is difficult to change the optical systems separately or simultaneously at a high speed.

A conventional free space optics communication apparatus which uses a light beam to perform point-to-multipoint information transmission radiates light toward a plurality of other apparatuses at remote locations to cover the entire range in which the other apparatuses are present as in radio communication. In this case, the transmission side needs to output light at a high level to allow the individual other apparatuses to receive light with sufficient levels.

In the free space optics communication apparatus, however, the transmission side has a limited output level of light from the viewpoint of the lifetime of a light-emitting element or the like. It is thus impossible to radiate light at a sufficient level in the entire range in which the other apparatuses are present.

In general, the free space optics communication apparatus which uses a light beam to transmit information to a plurality of other apparatuses at remote locations has a plurality of mirrors which reflect and send emerging light from the apparatus itself toward the plurality of other apparatuses or reflect and take light sent from the plurality of other apparatuses into a light-receiving section thereof. Since each of the plurality of mirrors is set at an angle appropriate for transmission and reception of light between the apparatus and each of the other apparatuses, the use of the mirrors enables efficient transmission and reception of light in the free space optics communication apparatus for point-to-multipoint communication.

As described above, the free space optics communication apparatus needs to have a margin for a certain deviation of the optical axis of received light transmitted by any of the other apparatuses from the optical axis of the light-receiving section thereof to avoid a deteriorated S/N ratio due to such a deviation caused by fluctuations of the air or the like.

The margin for a deviation is increased by setting a larger divergent angle of emerging light on the transmission side. Typically, such a large divergent angle of an output light beam is achieved by providing a concave surface for the plurality of mirrors which reflect and send emerging light to the plurality of other apparatuses or reflect and take light transmitted from the plurality of other apparatuses into the light-receiving section.

FIG. 16 shows a conventional free space optics communication apparatus. Reference numeral 901 shows a transmitting circuit, 902 a light-emitting element, 903 a polarization beam splitter which separates transmission light and received light, and 904 a concave mirror unit which allocates light to other apparatuses. Reference numeral 905 shows a light-receiving element, and reference numeral 906 shows a receiving circuit.

The transmitting circuit 901 converts a signal to be transmitted into a signal which can be electro-optically converted. The light-emitting element 902 converts the signal into light which then emerges as a light beam. The transmission light emerging from the light-emitting element 902 passes through the polarization beam splitter 903, is reflected by the concave mirror unit 904, and is directed toward each of the plurality of other apparatuses.

On the other hand, a light beam transmitted from any of the other apparatuses is reflected by the concave mirror unit 904, and sent to the polarization beam splitter 903. The light beam reflected by the polarization beam splitter 903 is converted into an electric signal by the light-receiving element 905, and information included in the signal is received by the receiving circuit 906.

The concave mirror unit 904 has the structure as shown in FIG. 17. Specifically, four concave mirrors 910 are arranged as in FIG. 17, in which each of the concave mirrors 910 is supported to be movable at any angle.

In the prior art, however, the number of the mirrors in the free space optics communication apparatus is determined in the manufacturing stage of the apparatus. Thus, when the apparatus is actually installed, the number of mirrors is not always consistent with the number of other apparatuses at that point.

If the number of the other apparatuses is smaller than the number of the mirrors, a, certain number of mirrors are not used corresponding to the difference between them. In this case, since light from the light source is always made incident on the mirrors, light sent from the unused mirrors is unnecessary.

In addition, since the mirrors have the same curvatures, problems arise both when the other apparatus is located at a shorter distance and when at a longer distance. For the other apparatus at a shorter distance, received light has a small beam diameter and is incident on the light-receiving element at too high a level, which may cause a failure of the light-receiving element. For the other apparatus at a longer distance, received light has an extremely large beam diameter and a smaller amount of light is received to reduce the margin for rain or the like, in which case communication may be interrupted by a little rain or fog. Thus, the communication range is limited in the prior art.

When the number of other apparatuses is larger than the number of the mirrors, an additional apparatus (apparatus on the transmission side) is installed, or when the number of other apparatuses is smaller than the number of the mirrors, light sent from extra mirrors is unnecessary. In addition, an available communication range is limited.

SUMMARY OF THE INVENTION

It is an object of the present invention to provide a free space optics communication apparatus which achieves high use efficiency of light and enables free control of the divergent angle of a light beam and the like.

To achieve the aforementioned objects, the free space optics communication apparatus according to the present invention has a light source which emits a light beam for performing wireless communication of information, and a minute mirror array unit which consists of a plurality of minute mirrors arranged in a matrix-like form and reflects the light beam emitted from the light source toward another apparatus. The apparatus also has a control unit which controls the directions of the individual minute mirrors constituting the minute mirror array unit independently. The control unit may be used to variably control the number of a plurality of mirror groups formed of a plurality of the minute mirrors in the minute mirror array unit.

These and other characteristics of the free space optics communication apparatus according to the present invention will be apparent from the following description of specific embodiments with reference to the drawings.

BRIEF DESCRIPTION OF THE DRAWINGS

FIG. 11 shows the structure of another minute mirror array unit;

DETAILED DESCRIPTION OF THE PREFERRED EMBODIMENTS

Embodiments of the present invention are hereinafter described with reference to the drawings.

(Embodiment 1)

Figure 1:
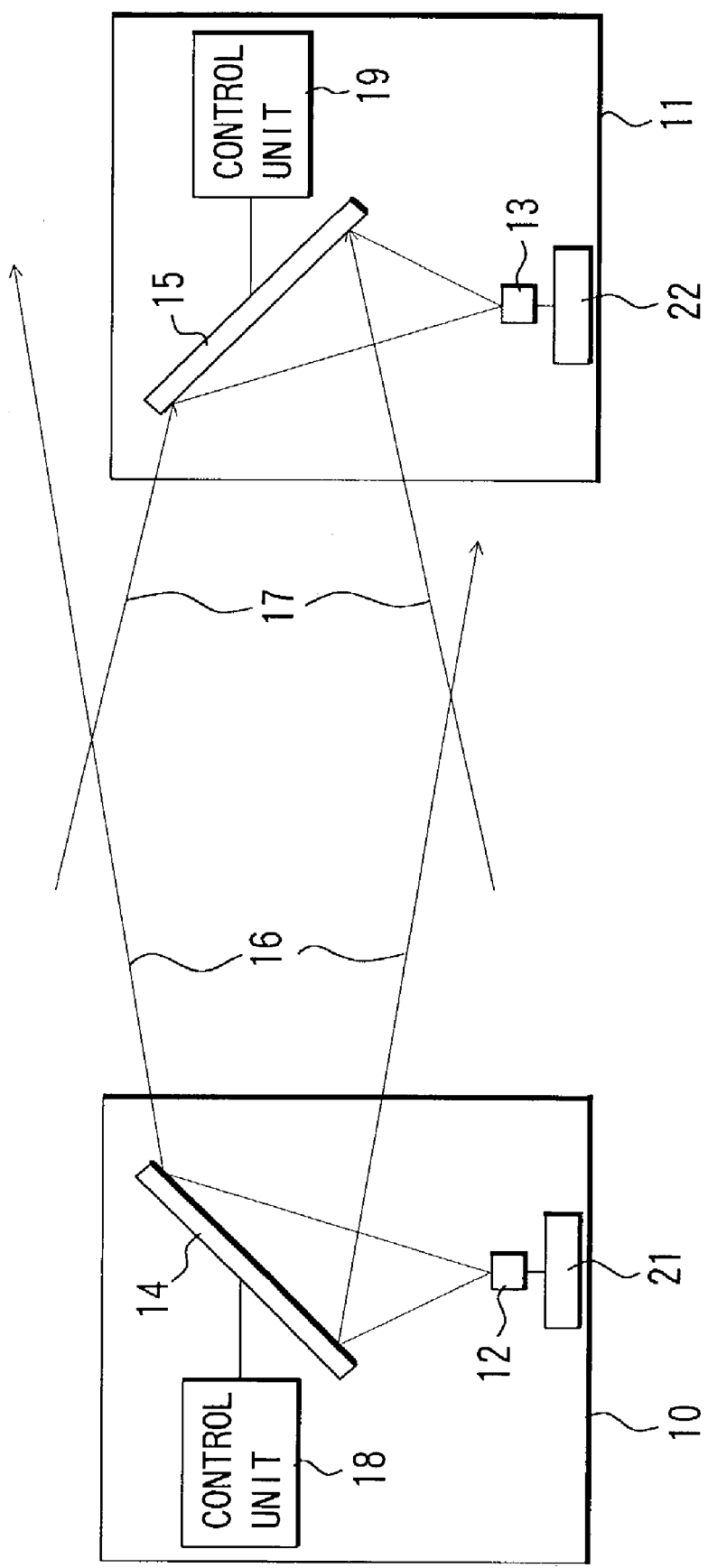
FIG. 1 is a schematic view showing the structure of a free space optics communication system which is Embodiment 1 of the present invention.

FIG. 1 shows the overview of a free space optics communication system which is Embodiment 1 of the present invention. The system of Embodiment 1 uses a minute mirror array unit formed by arranging a number of minute mirrors in a matrix-like form, the directions of which can be controlled independently, instead of the lens, prism or the like used in the conventional system.

In FIG. 1, reference numeral 10 shows a free space optics communication apparatus on the transmission side (hereinafter referred to as "transmission-side apparatus"), while reference numeral 11 shows a free space optics communication apparatus on the reception side (hereinafter referred to as "reception-side apparatus").

The transmission-side apparatus 10 comprises a light-emitting element (light source) 12 such as a semiconductor laser or the like, a minute mirror array unit 14 which reflects a light beam (which is already modulated in accordance with information to be transmitted) emitted from the light-emitting element 12 toward the reception-side apparatus 11, and a control unit 18 which controls the directions of individual minute mirrors constituting the minute mirror array unit 14 independently.

Reference numeral 21 shows a transmitting circuit which converts a signal including information to be transmitted into a signal which can be converted electro-optically by the light-emitting element 12. The light-emitting element 12 converts the signal into light which then emerges therefrom.

On the other hand, the reception-side apparatus 11 comprises a light-receiving element 13, a minute mirror array unit 15 which reflects the light beam emerging from the transmission-side apparatus 10 toward the light-receiving element 13, and a control unit 19 which controls the directions of individual minute mirrors constituting the minute mirror array unit 15 independently.

Reference numeral 22 shows a receiving circuit. After the light-receiving element 13 converts the light beam into an electrical signal, the receiving circuit 22 receives information included in the electrical signal.

Although not shown, the transmission-side apparatus 10 is provided with a light-receiving element, a receiving circuit, and a beam splitter which separates a light path for guiding a light beam reflected by the minute mirror array unit 14 to the light-receiving element and a light path for guiding a light beam from the light-emitting element 12 to the minute mirror array unit 14. The light-receiving element and the receiving circuit are similar to those provided in the reception-side apparatus 11.

On the other hand, although not shown, the reception-side apparatus 11 is provided with a light-emitting element, a transmitting circuit, and a beam splitter which separates a light path for guiding a light beam from the light-emitting element to the minute mirror array unit 15 and a light path for guiding a light beam reflected by the minute mirror array unit 15 toward the light-receiving element 13. The light-emitting element and the transmitting circuit are similar to those provided in the transmission-side apparatus 10.

In other words, the transmission-side apparatus 10 and the reception-side apparatus 11 have the same structures, and each of them has both a transmitting function and a receiving function of information through a light beam.

In the following, however, description is made for the case where information is transmitted from the transmission-side apparatus 10 to the reception-side apparatus 11 through a light beam.

In the system configured above, a light beam emitted from the light-emitting element 12 of the transmission-side apparatus 10 is reflected by the minute mirror array unit 14. The divergent angle (that is, the diameter of the beam), the pattern (shape), the emerging direction and the light-receiving direction of the reflected light beam 16 can be set variably by the control unit 18 controlling the directions of the respective minute mirrors constituting the minute mirror array unit 14. The directions of the respective minute mirrors are controlled such that the light beam 16 is sent to the space at a certain size of divergent angle.

On the other hand, a light beam 17 emerging from the transmission-side apparatus 10 and incident on the reception-side apparatus 11 is converged by the minute mirror array unit 15 of the reception-side apparatus 11 and incident on the light-receiving element 13. At this point, the directions of the respective minute mirrors are controlled such that they have a certain light-receiving angle and a small spot of light is formed on the light-receiving element 13.

The control units 18 of the transmission-side apparatus 10 and the control units 19 of the reception-side apparatus 11 control the directions of the respective minute mirrors to set the optimal divergent angle of the light beam, light-receiving angle, pattern, emerging direction, and light-receiving direction under transmission conditions such as the distance (communication distance) between the transmission-side apparatus 10 and the reception-side apparatus 11, scintillation, weather, the size and shape of a building present between the transmission-side apparatus 10 and the reception-side apparatus 11, and vibrations of bases on which the transmission-side and reception-side apparatuses 10 and 11 are installed, respectively. Although not shown, a detector is provided for detecting the respective communication conditions and sending a detection signal to the control units 18 and 19.

An operator may set the directions of the respective minute mirrors. Specifically, each of the control units 18 and 19 is provided with an operation section, not shown, to allow control of the directions of the respective minute mirrors with the control units 18 and 19 in response to operation of a switch, keyboard or the like provided for the operation section.

For changing the beam emerging direction or the light-receiving direction, a uniform angle change has only to be made in the individual minute mirrors of the minute mirror array units 14 and 15 in the structure of FIG. 1. For example, when an angle change by 0.2 degrees is desired in the emerging angle, control may be performed to move all the individual minute mirrors in the same direction by 0.1 degrees.

The control of the emerging direction and light-receiving direction can be realized by the minute mirror array units 14 and 15 simultaneously with the control of the divergent angle of the light beam and the control of the beam pattern described earlier.

The system configured in this manner allows easy setting of the divergent angle of the light beam, the light-receiving angle, the pattern, the emerging direction, and the light-receiving direction in accordance with the installation conditions and environments of the transmission-side apparatus 10 and the reception-side apparatus 11.

Next, the minute mirror array units 14 and 15 are described in detail with reference to FIG. 2. While FIG. 2 shows only the minute mirror array unit 14 provided for the transmission-side apparatus 10, the minute mirror array unit 15 provided for the reception-side apparatus 11 has the same structure.

The minute mirror array unit 14 has a number of minute mirrors 14a arranged vertically and horizontally in a matrix-like form. The angles of the individual minute mirrors can be set variably by an electric signal from the control unit 18 driving an actuator, not shown. While FIG. 2 shows the minute mirror array unit 14 consisting of a total of 225 minute mirrors 14a of 15 by 15, the number of minute mirrors other than this may be employed, and the shape of the minute mirror array unit may be circular or polygonal, rather than the square shown in FIG. 2.

The directions of the individual minute mirrors of the minute mirror array units 14 and 15 configured in this manner are controlled independently, thereby causing each of the minute mirror array units 14 and 15 to function as a converging optical system.

Figure 2:
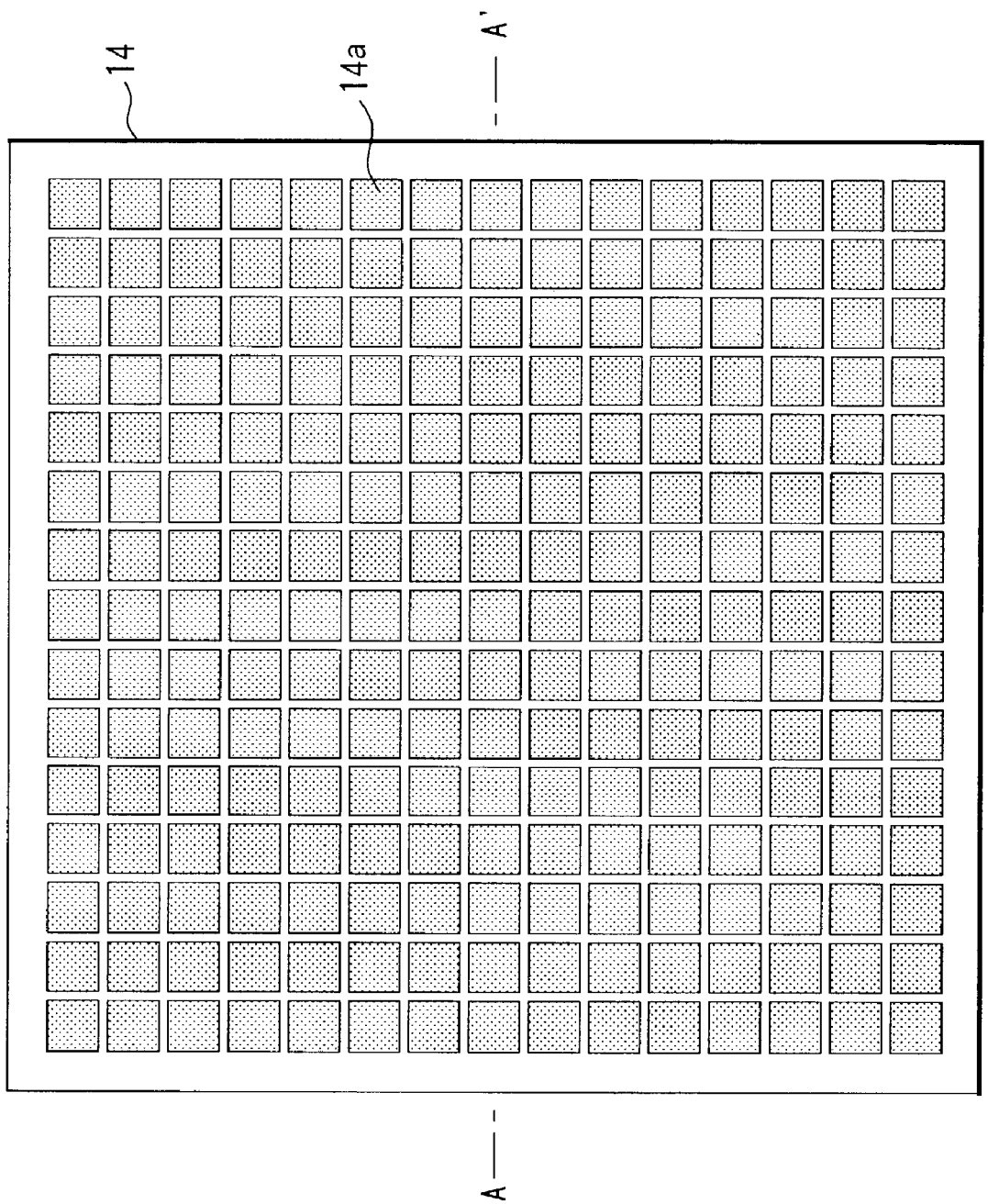
FIG. 2 is a diagram for explaining a minute mirror array unit of the free space optics communication system in Embodiment 1.
Figure 3:
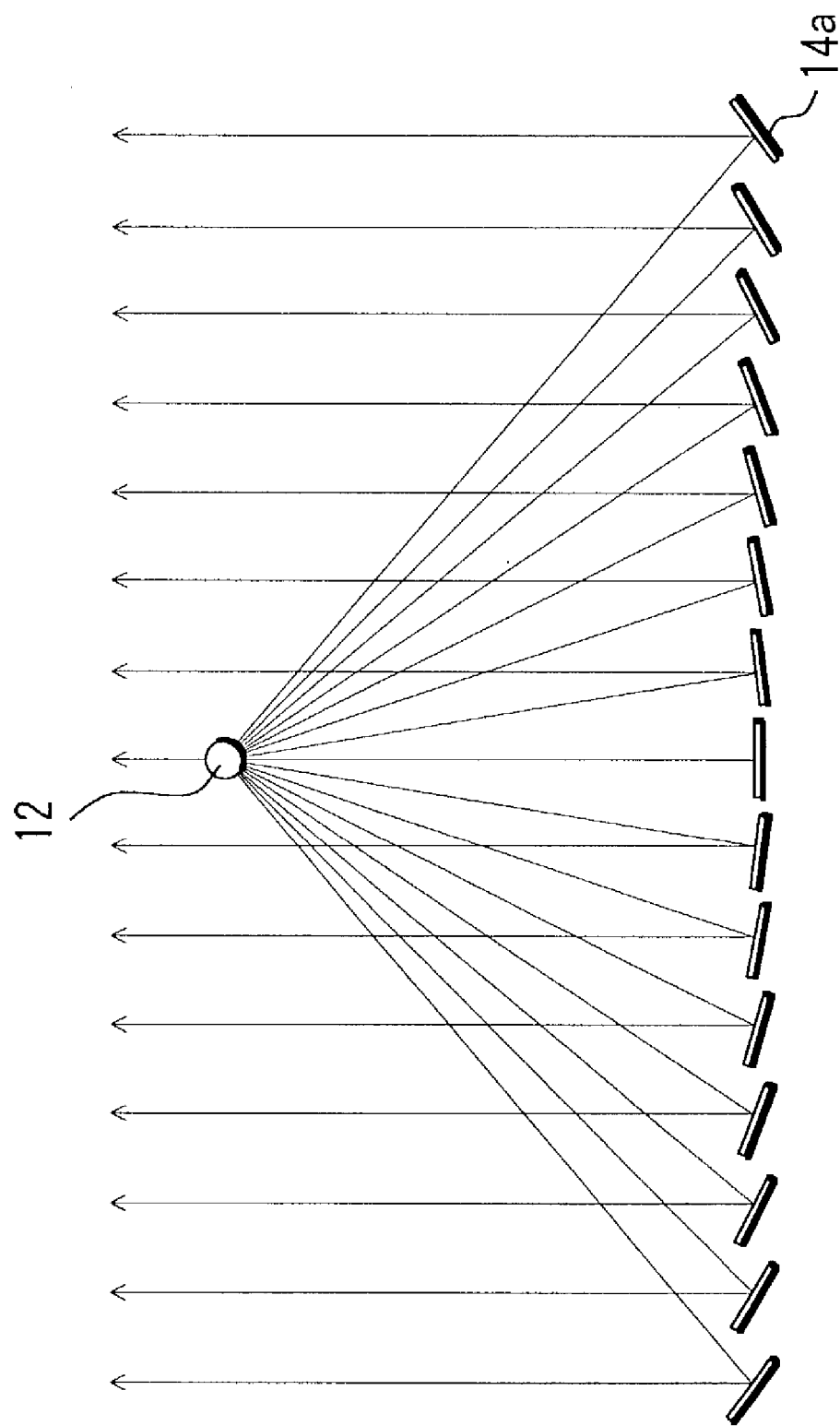
FIG. 3 is a diagram for explaining the light converging effect of the minute mirror array unit in Embodiment 1.

FIG. 3 shows the minute mirror array unit 14 shown in FIG. 2 taken along a line A–A'. FIG. 3 shows the light-emitting element (point source of light) 12 disposed in front of the minute mirror array unit 14 from which a light beam emerges as substantially parallel rays.

The directions of the individual minute mirrors 14a of the minute mirror array unit 14 are controlled in this manner. Thus, a light beam which consists of substantially parallel rays or a light beam at a large or small divergent angle can emerge therefrom.

On the other hand, the directions of the individual minute mirrors of the minute mirror array unit 15 in the reception-side apparatus 11 are controlled such that the light-receiving element 13 does not receive light from an unnecessary light source present as a background of the transmission-side apparatus 10. When the unnecessary light source moves as the sun does, the directions of the minute mirrors may be controlled in accordance with the movement of the unnecessary light source.

Figure 4:
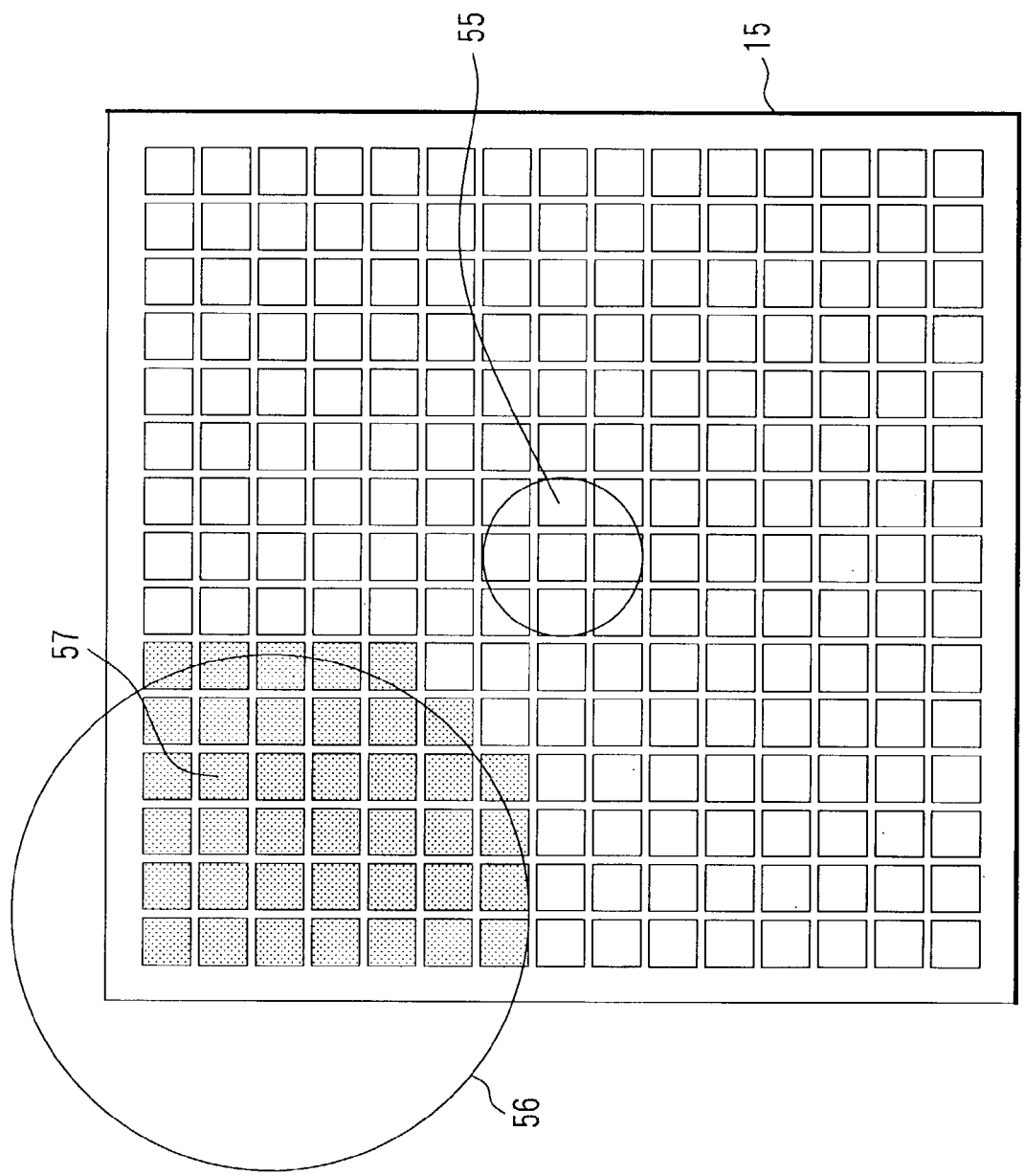
FIG. 4 is a diagram for explaining how to deal with unnecessary light which is incident on the minute mirror array unit in Embodiment 1.
Figure 15:
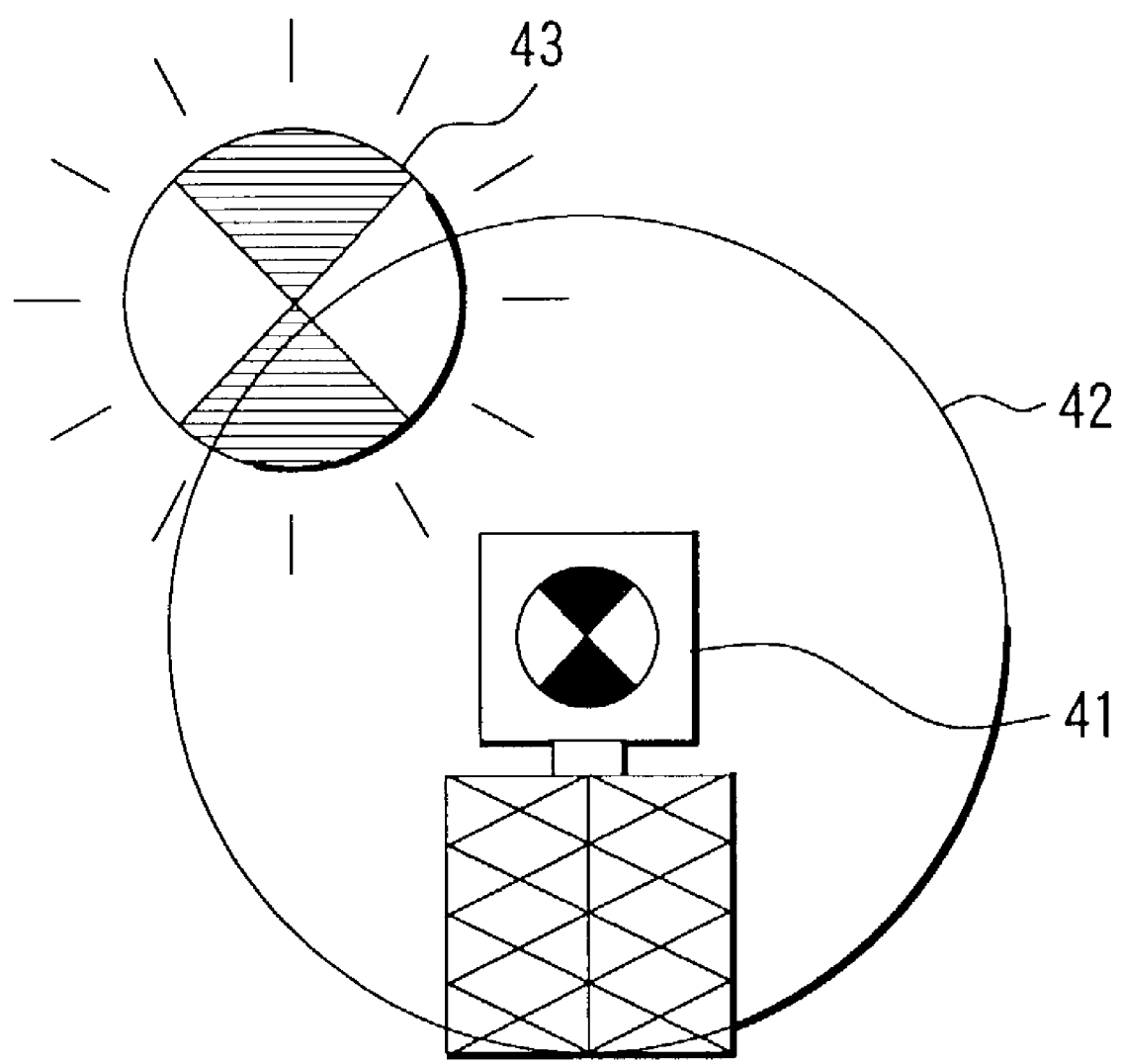
FIG. 15 is a diagram for explaining the case where the sun exists in the background on the transmission side in the free space optics communication system.
Figure 16:
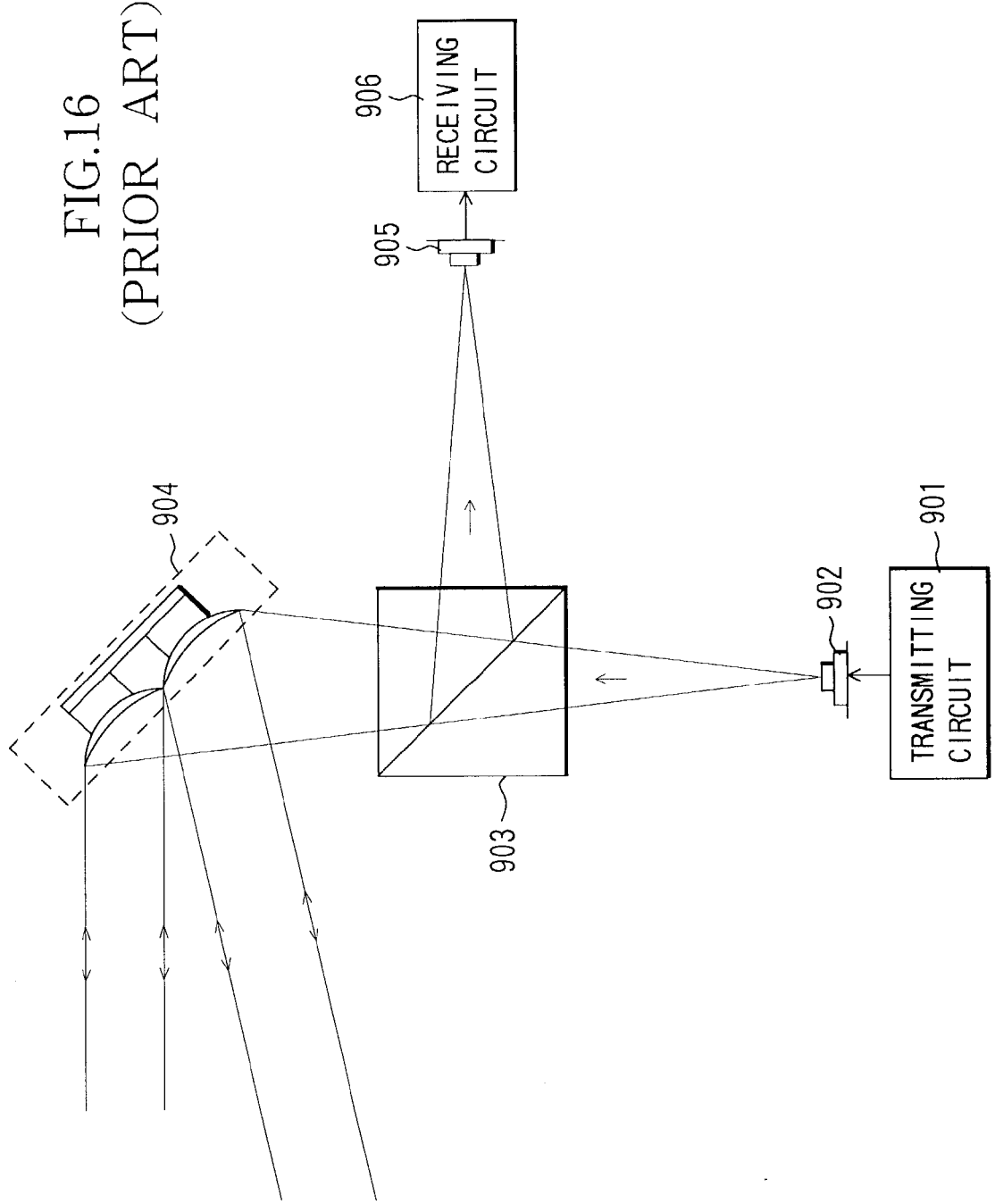
FIG. 16 is a diagram showing the structure of a conventional free space optics communication apparatus.
Figure 17:
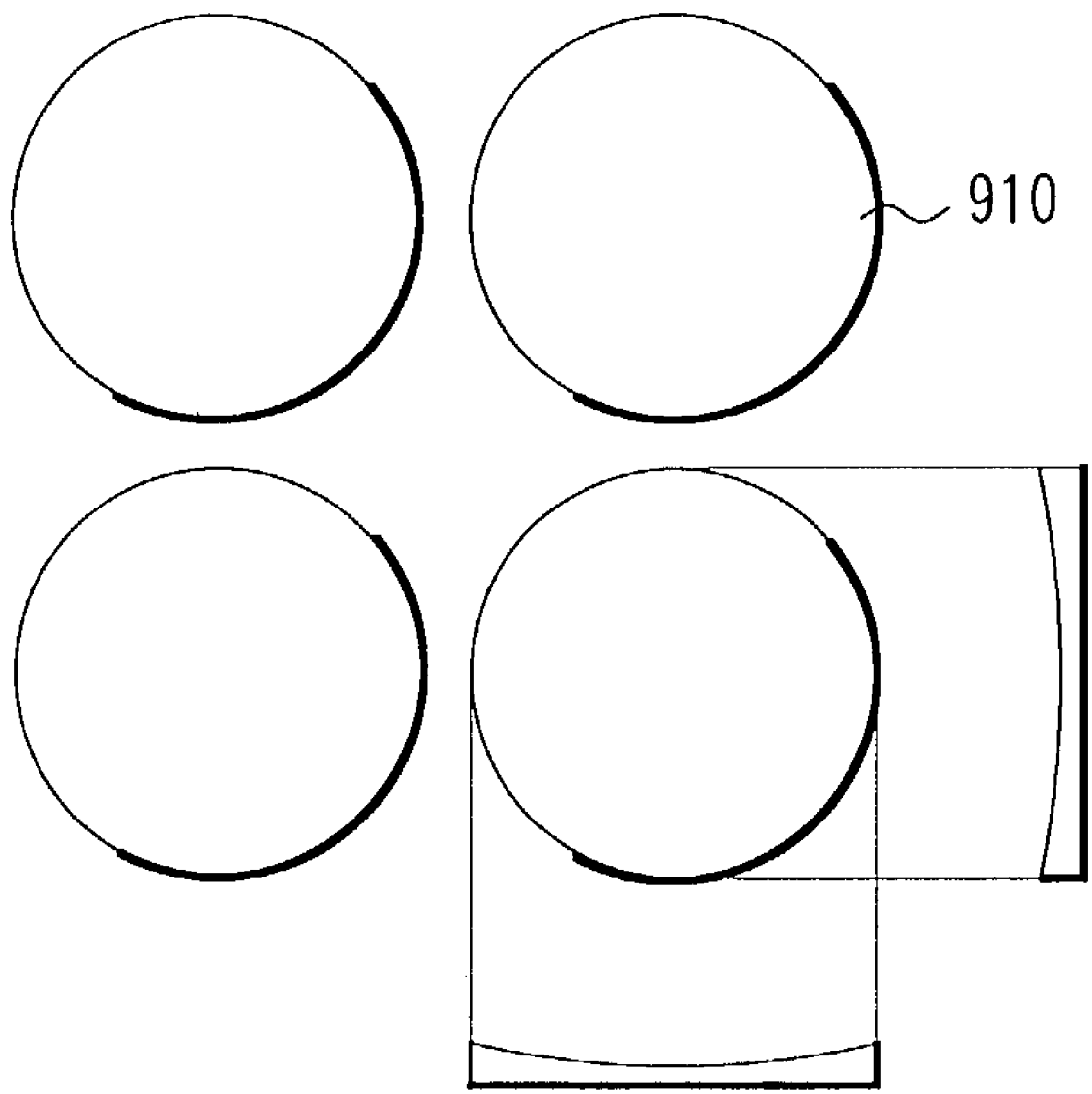
FIG. 17 is a schematic view of a concave mirror unit in the conventional free space optics communication apparatus.

Specifically, in a situation as shown in FIG. 15, the minute mirror array unit 15 of the reception-side apparatus 11 includes an area 55 on which the light beam from the transmission-side apparatus 10 is incident and an area 56 on which the unnecessary light such as the sunlight is incident as shown in FIG. 4. In this case, the directions of minute mirrors 57 in the area 56 on which the unnecessary light is incident (a dark color area in FIG. 4) are controlled not to face the light-receiving element 13 to prevent the light reflected thereby from being converged to the light-receiving element 13. The minute mirrors except for the minute mirrors 57 included in the unnecessary light area 56 constitute a converging mirror for the light-receiving element 13.

In this manner, the individual minute mirrors are controlled to avoid incidence of light other than the intended incident light on the light-receiving element 13 to prevent reception interference.

While Embodiment 1 has been described for the case where the transmission-side apparatus and the reception-side apparatus communicate with each other on a point-to-point basis, the system is applicable to the case where a plurality of minute mirror array units are provided on the transmission side to perform point-to-multipoint communication.

As described above, according to Embodiment 1, the minute mirror array units can be used to control the emerging angle of the light beam, the light-receiving angle, the emerging direction, and the light-receiving direction. Thus, the light beam emitted from the light source can be sent to the transmission space with a minimized amount of wasted component, and the divergent angle and the like of the light beam can be controlled with a simple structure.

In addition, the pattern of the light beam can also be controlled simultaneously. As compared with the conventional apparatus which uses an optical system such as a solid-state lens, the apparatus can be simplified and reduced in size.

(Embodiment 2)

Figure 5:
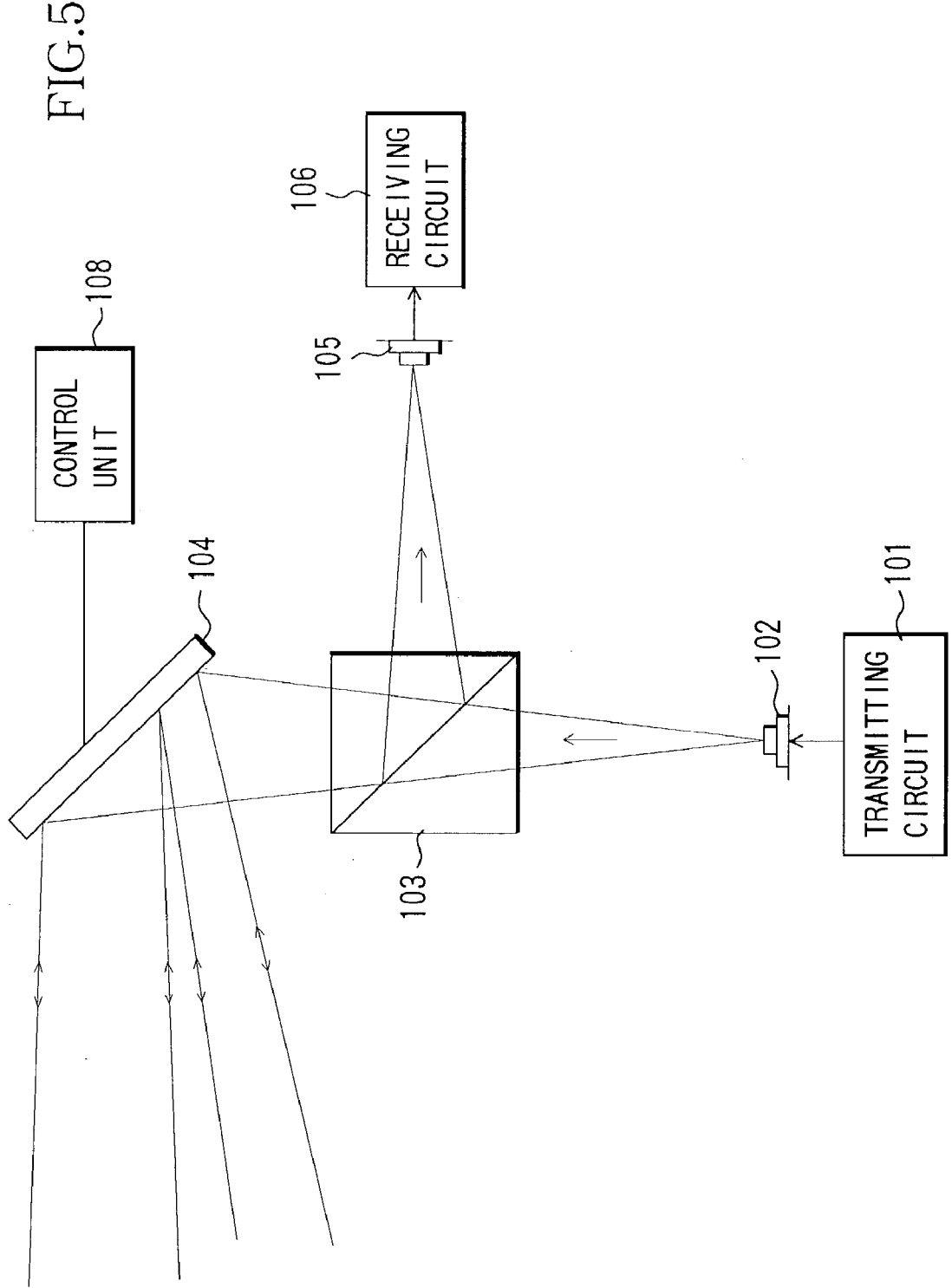
FIG. 5 is a schematic view showing the structure of a free space optics communication apparatus which is Embodiment 2 of the present invention.

FIG. 5 shows the overview of a free space optics communication apparatus which is Embodiment 2 of the present invention. Although not shown, another free space optics communication apparatus with which communication will be made has the structure similar to the free space optics communication apparatus in FIG. 5. A free space optics communication system is formed of the free space optics communication apparatus shown in FIG. 5 and a plurality of other apparatuses.

In FIG. 5, reference numeral 101 shows a transmitting circuit, 102 a light-emitting element (light source), 103 a polarization beam splitter which separates transmission light from received light, and 104 a minute mirror array unit. Reference numeral 105 shows a light-receiving element, and reference numeral 106 shows a receiving circuit. Reference numeral 108 shows a control unit which controls the directions of individual minute mirrors constituting the minute mirror array unit 104 independently.

The transmitting circuit 101 converts a signal including information to be transmitted into a signal which can be electro-optically converted by the light-emitting element 102. The light-emitting element 102 converts the signal into light which then emerges therefrom.

The light beam emerging from the light-emitting element 102 passes through the polarization beam splitter 103, is reflected by the minute mirror array unit 104, and emerges toward the plurality of other apparatuses (not shown).

On the other hand, a light beam transmitted from each of other apparatuses is reflected by minute mirrors arranged in a matrix-like form to constitute the minute mirror array unit 104. The reflected light beam is sent to the polarization beam splitter 103. The light beam is reflected by the polarization beam splitter 103, guided to the light-receiving element 105, and converted into an electrical signal by the light-receiving element 105. Then, information included in the electrical signal is received by the receiving circuit 106.

Figure 10:
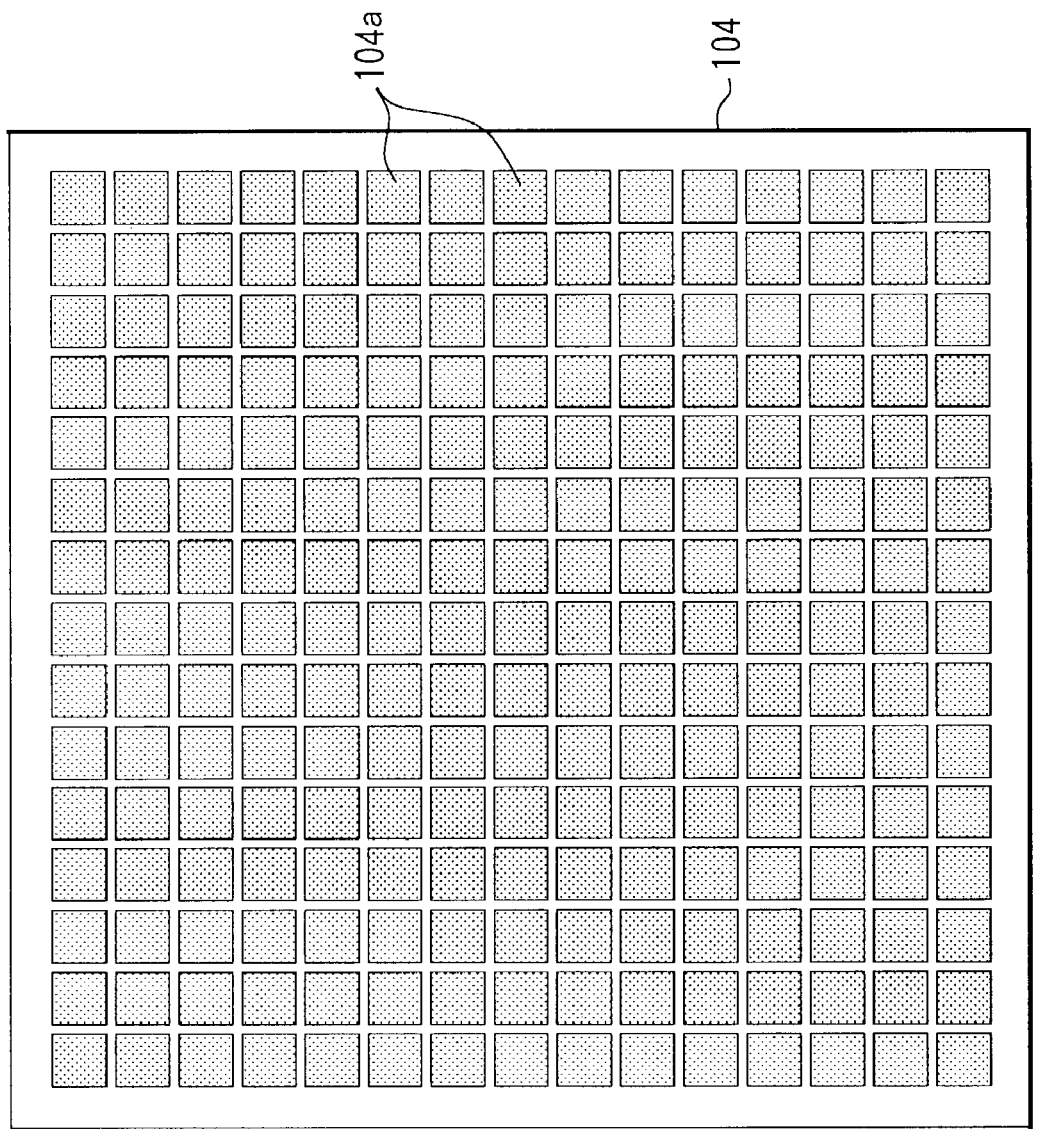
FIG. 10 shows the structure of the minute mirror array unit in Embodiment 2.
Figure 12:
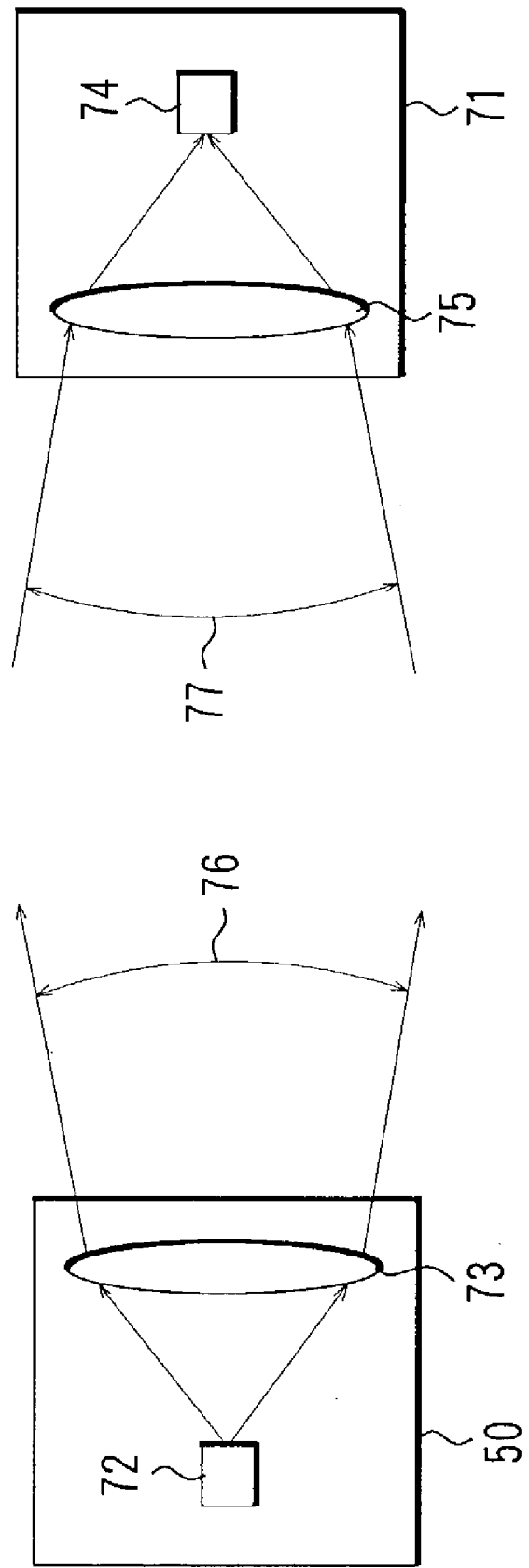
FIG. 12 is a diagram for explaining a conventional free space optics communication system.
Figure 13:
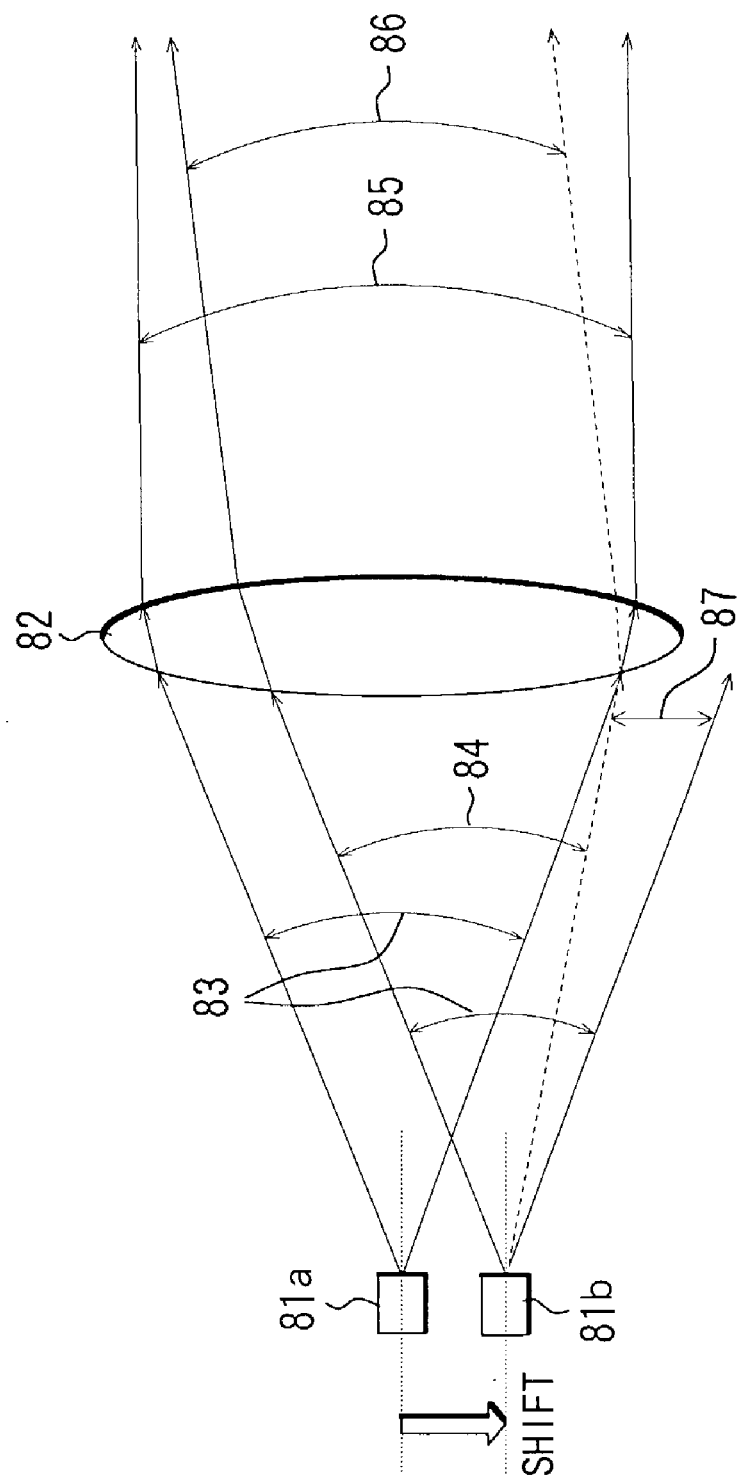
FIG. 13 is a diagram for explaining how the emerging direction of a light beam is controlled in the conventional free space optics communication system.
Figure 14:
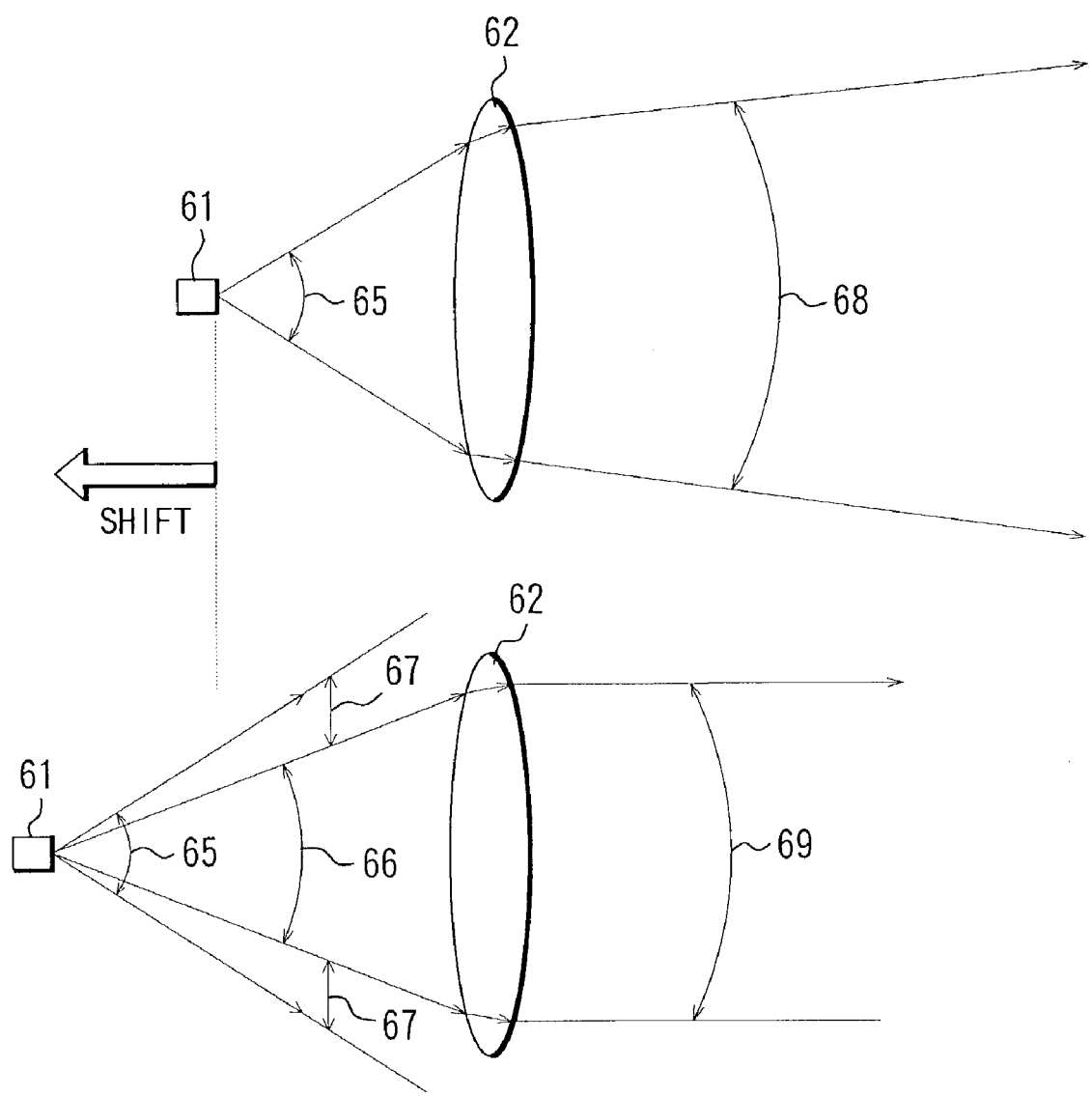
FIG. 14 is a diagram for explaining how the diameter of a light beam is controlled in the conventional free space optics communication system.

FIG. 10 shows the minute mirror array unit 104 in detail. The minute mirror array unit 104 is formed of a number of minute mirrors 104a arranged in a matrix-like form. The angle of each minute mirror 104a can be set freely by an electrical signal from the control unit 108.

Figure 9:
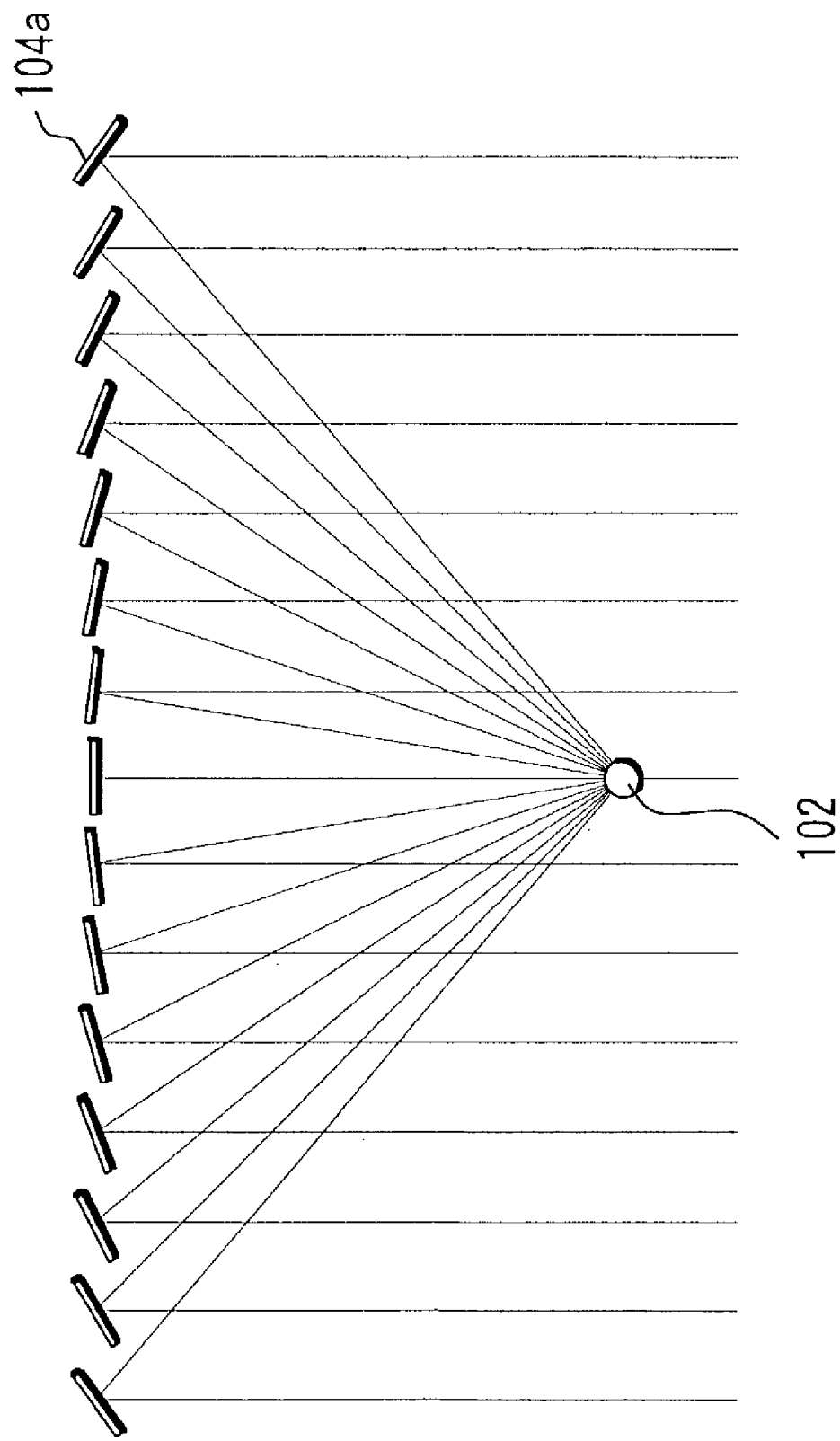
FIG. 9 is a section view of the mirror group in Embodiment 2.

A mirror group which consists of a certain number of minute mirrors forming part of the minute mirror array unit 104 can function as a converging mirror (hereinafter, the mirror group is referred to as "pseudo converging mirror") by setting the respective minute mirrors at appropriate angles as shown in FIG. 9.

Thus, an arbitrary number of the pseudo converging mirrors can be formed in the minute mirror array unit 104. In addition, the reflective area of a single pseudo converging mirror can be changed by changing the number of minute mirrors which constitute the pseudo converging mirror.

Additionally, the degree of light convergence of a pseudo converging mirror can be changed by adjusting the angles of minute mirrors which constitute the pseudo converging mirror. Since the angles correspond to the curvature of a concave mirror, it is represented as "the curvature of a pseudo converging mirror" in the following description.

The minute mirror array unit 104 configured as above is used in point-to-multipoint free space optics communication, and a plurality of pseudo converging mirrors are formed in the minute mirror array unit 104. Consequently, the following effects are expected.

For one thing, even when the number of other apparatuses is changed, pseudo converging mirrors (in some cases, pseudo light diverging mirrors) can be formed corresponding to the number of the other apparatuses to allow efficient reception of light beams by the other respective apparatuses.

In addition, since a change in number of minute mirrors constituting a pseudo converging mirror can change the reflective area of the pseudo converging mirror, an amount of transmission light can be divided arbitrarily in accordance with the distances to the other apparatuses. Specifically, the number of minute mirrors constituting a pseudo converging mirror for another apparatus at a longer distance is set to be larger than the number of minute mirrors for another apparatus at a shorter distance.

Furthermore, the adjustment of the angles of minute mirrors constituting a pseudo converging mirror can change the curvature of the pseudo converging mirror, so that an appropriate beam diameter can be set for another apparatus.

Figure 6:
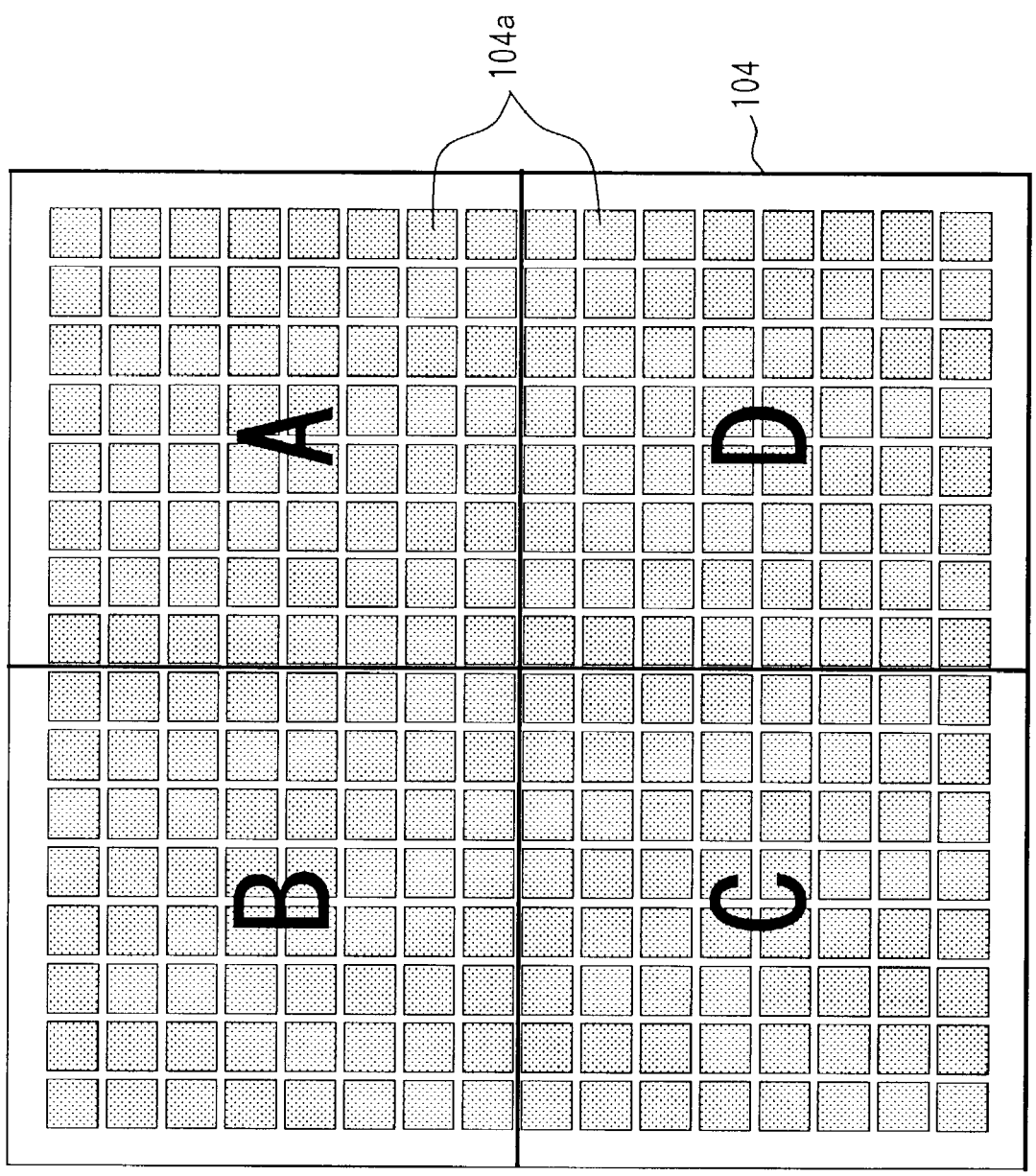
FIG. 6 is a diagram showing mirror groups arranged in a minute mirror array unit in the free space optics communication apparatus in Embodiment 2 when four other apparatuses exist.

Next, description is made for communication methods when four other apparatuses exist and when two other apparatuses exist. When four other apparatuses exist, four pseudo converging mirrors are formed in the minute mirror array unit 104 as shown in FIG. 6. In FIG. 6, a pseudo converging mirror formed at the upper right in the minute mirror array unit 104 is referred to as an A group, a pseudo converging mirror formed at the upper left as a B group, a pseudo converging mirror formed at the lower left as a C group, and a pseudo converging mirror formed at the lower right as a D group.

The pseudo converging mirrors are formed in groups in this manner. The minute mirrors are controlled by electrical signals to set the angles of the minute mirrors of the respective groups such that the A, B, C, and D groups reflect a light beam emitted from the light-emitting element 102 toward the corresponding other apparatuses or reflect light beams emerging from other apparatuses toward the polarization beam splitter 103 and the light-receiving element 105.

Figure 7:
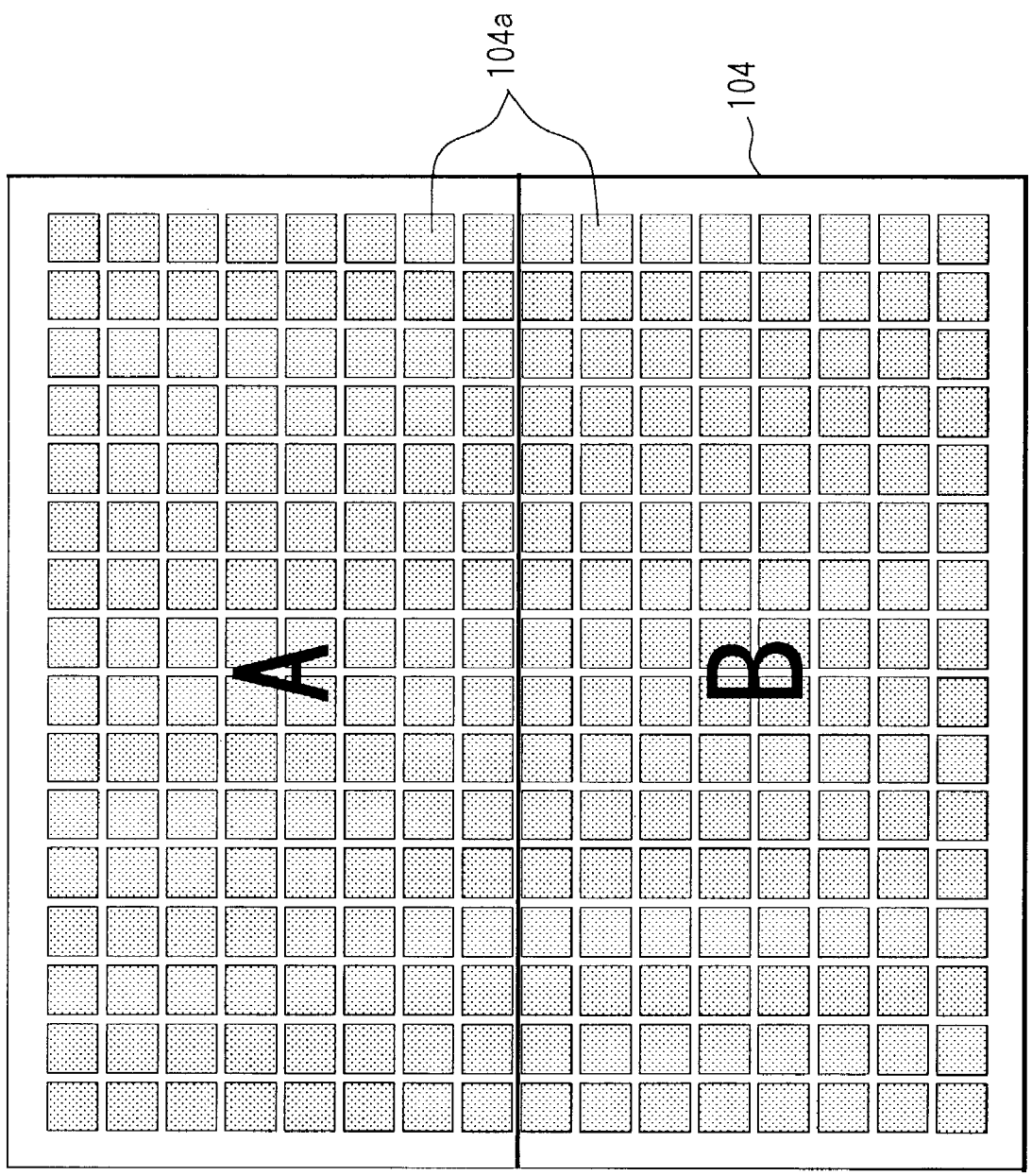
FIG. 7 is a diagram showing mirror groups arranged in the minute mirror array unit in the free space optics communication apparatus in Embodiment 2 when two other apparatuses exist.

On the other hand, when two other apparatuses exist, two pseudo converging mirrors are formed in the minute mirror array unit 104 as shown in FIG. 7. In FIG. 7, a pseudo converging mirror formed at the top in the minute mirror array unit 104 is referred to as an A group, and a pseudo converging mirror formed at the bottom is referred to as a B group.

The pseudo converging mirrors are formed in groups in this manner. The minute mirrors are controlled by electrical signals to set the angles of the minute mirrors of the respective groups such that the A and B groups reflect a light beam emitted from the light-emitting element 102 toward the corresponding other apparatuses or reflect light beams emerging from other apparatuses toward the polarization beam splitter 103 and the light-receiving element 105.

As seen from FIGS. 6 and 7, even when the number of the other apparatuses is changed, all the emerging light from the apparatus can be allocated to the other apparatuses, which achieves high efficiency.

When communication is made with another apparatus at a longer distance, an amount of light attenuation is increased in proportion to distance. For example, a comparison of amounts of attenuation in communication with other apparatuses at distances of 1 km and 2 km when it rains shows that the amount of attenuation at the distance of 2 km is equal to the square of the amount of attenuation at the distance of 1 km. Thus, when communication is made with another apparatus at a longer distance, a larger amount of light needs to emerge on the transmission side than in communication with another apparatus at a shorter distance in order to ensure a margin for attenuation of light equal to that for the other apparatus at the shorter distance. In contrast, when communication is made with another apparatus at a shorter distance, a small amount of emerging light may be enough since an amount of attenuation is small.

Figure 8:
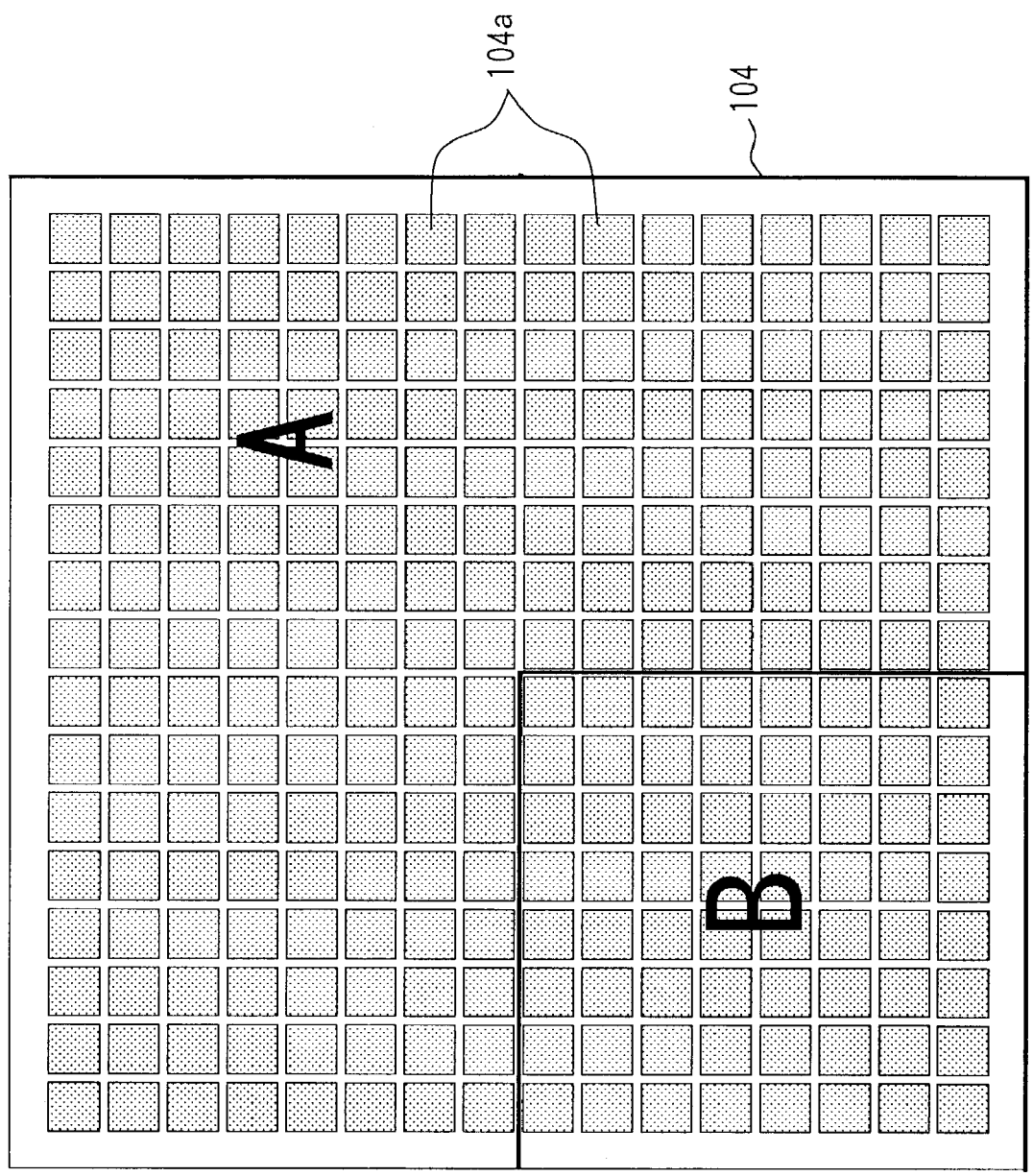
FIG. 8 is a diagram showing mirror groups arranged in the minute mirror array unit in the free space optics communication apparatus in Embodiment 2 when two other apparatuses are located at a longer distance and a shorter distance, respectively.

Description is made for communication methods performed when other apparatuses are located at a longer distance and a shorter distance, respectively. If two other apparatuses are installed at a longer distance and at a shorter distance, respectively, a mirror group A corresponding to the other apparatus located at the longer distance and a mirror group B corresponding to the other apparatus located at the shorter distance are arranged in the minute mirror array unit 104 as shown in FIG. 8. As can be seen, the number of minute mirrors constituting the mirror group A is larger than the number of minute mirrors constituting the mirror group B.

Most of the components of a light beam incident on the minute mirror array unit 104 are transmitted to the other apparatus at the longer distance, while a minimal light component is transmitted to the other apparatus at the shorter distance. It is thus possible to provide the other apparatus at the longer distance with a margin for attenuation equal to that for the other apparatus at the shorter distance. Extra light more than necessary is not transmitted to the other apparatus at the shorter distance. As a result, balanced allocation of light is achieved without waste.

Next, description is made for setting of the divergent angle of a light beam appropriate for other apparatuses at a longer distance and a shorter distance.

For example, consider the case where light beams at the same divergent angles are transmitted to the other apparatus at the longer distance and the other apparatus at the shorter distance. When light is output toward the other apparatus at the longer distance with a sufficient margin for attenuation due to rain or the like, the diameter of the beam is small and the energy of the light is concentrated in the other apparatus at the shorter distance since the divergent angles are the same. As a result, the light-receiving element receives light at a higher level more than necessary.

In general, when the free space optics communication apparatus is used to perform communication with other apparatuses at a longer distance and a shorter distance, the divergent angle of a light beam on the transmission side is adjusted to provide the same beam diameters at the other apparatuses regardless of the distances.

When communication is performed with the other apparatuses at a longer distance and a shorter distance in Embodiment 2, the curvatures of the pseudo converging mirrors can be changed to adjust the divergent angles of the light beams such that the beams of the same diameter are received at the destinations regardless of the longer or shorter distance. Thus, it is possible to transmit light of appropriate beam diameter to other apparatuses at varying distances including longer and shorter distances.

Figure 11:
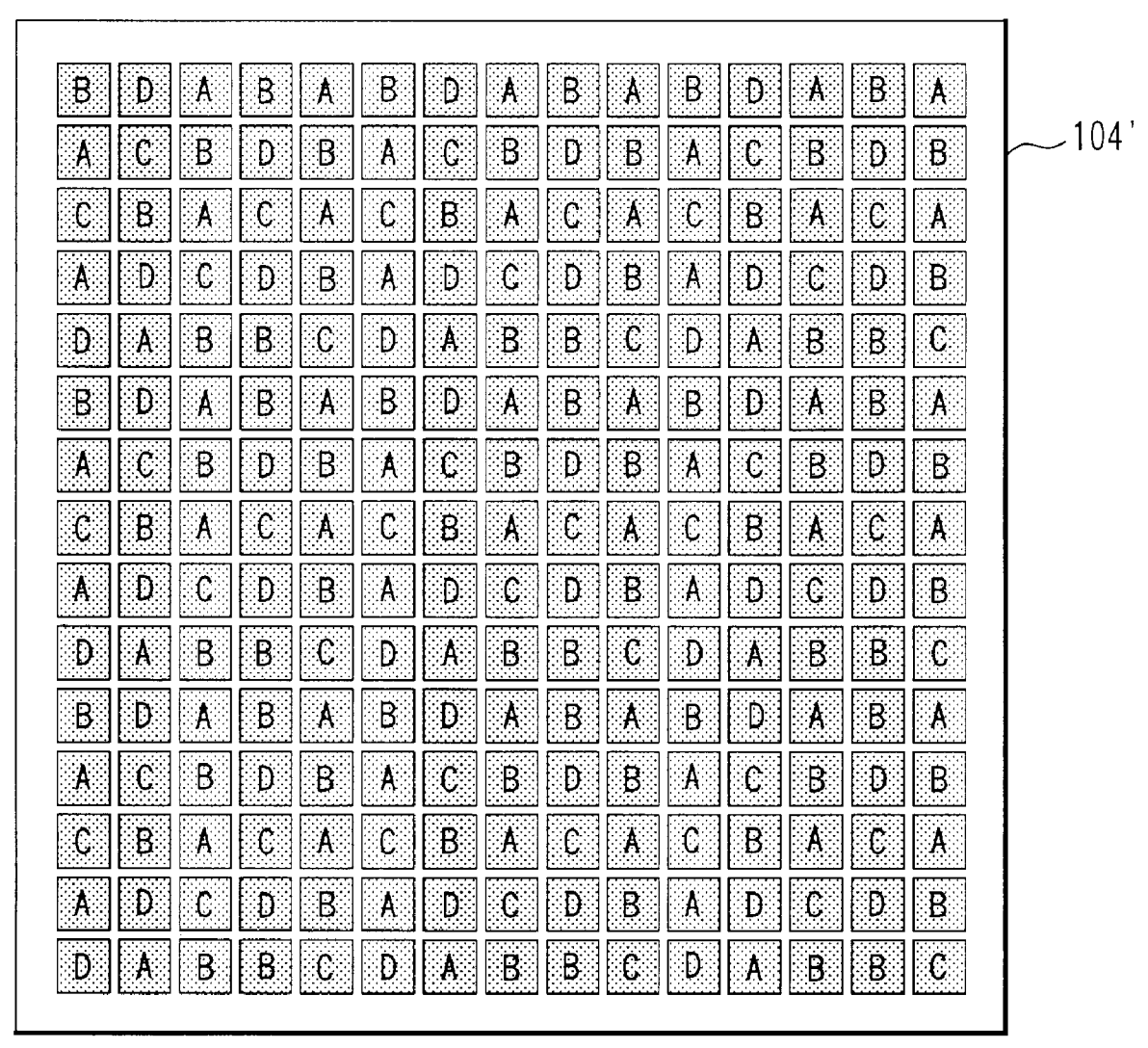

While Embodiment 2 has been described for the case where each of the pseudo converging mirrors (mirror groups) is collectively formed in the minute mirror array unit 104, minute mirrors constituting respective mirror groups may be discretely arranged in a minute mirror array unit 104' as shown in FIG. 11, for example.

As described above, according to Embodiment 2, mirror groups can be arbitrarily formed corresponding to the number of other apparatuses in performing point-to-multipoint free space optics communication. Thus, a single apparatus can support communication with various numbers of other apparatuses, and an emerging light beam can be utilized without waste.

In addition, since the numbers of minute mirrors constituting respective mirror groups can be changed or the curvatures of the mirror groups can be changed in accordance with the distances to the respective other apparatuses, information can be transmitted and received reliably to and from the other apparatuses at varying distances without waste.

While Embodiments 1 and 2 have been described for the free space optics communication apparatus which has both the transmitting function and the receiving function of a light signal (light beam), the system may be formed by combining a free space optics communication apparatus which has only the transmitting function with a free space optics communication apparatus which has only the receiving function.

While preferred embodiments have been described, it is to be understood that modification and variation of the present invention may be made without departing from the sprit or scope of the following claims.

What is claimed is:

1. A free space optics communication apparatus comprising:
   a light source which emits a light beam for performing wireless communication of information;
   a minute mirror array unit which consists of a plurality of minute mirrors arranged in a matrix-like form and reflects the light beam emitted from the light source toward another apparatus; and
   a control unit which controls directions of the individual minute mirrors constituting the minute mirror array unit independently,
   wherein at least one of a divergent angle of the reflected light beam, a pattern of the light beam, and a reflecting direction of the light beam can be changed by the control unit controlling the directions of the individual minute mirrors;
   wherein the control unit variably controls the number of a plurality of mirror groups formed of the plurality of minute mirrors in the minute mirror array unit, and the plurality of mirror groups reflect the light beam from the light source toward a plurality of other apparatuses; and
   wherein the control unit sets a larger number of the minute mirrors constituting the mirror group corresponding to the other apparatus at a longer distance.

2. A free space optics communication apparatus comprising:
   a light source which emits a light beam for performing wireless communication of information;
   a minute mirror array unit which consists of a plurality of minute mirrors arranged in a matrix-like form and reflects the light beam emitted from the light source toward another apparatus; and
   a control unit which controls directions of the individual minute mirrors constituting the minute mirror array unit independently,
   wherein the control unit changes the degree of light convergence of the light beam provided by the plurality of minute mirrors in accordance with a distance to the other apparatus,
   wherein the control unit variably controls the number of a plurality of mirror groups formed of the plurality of minute mirrors in the minute mirror array unit, and
   the plurality of mirror groups reflect the light beam from the light source toward a plurality of other apparatuses.

3. The free space optics communication apparatus according to claim 2, further comprising:
   a light-receiving element which receives a light beam for performing wireless communication of information,
   wherein each of the mirror groups reflects the light beam emerging from a plurality of locations away from the free space optics communication apparatus toward the light-receiving element.

4. A free space-optics communication system comprising:
   the free space optics communication apparatus according to claim 2, and
   a plurality of other apparatuses, each of which has at least a receiving function of receiving the light beam emerging from the free space optics communication apparatus.

* * * * *